United States Patent [19]
Duc

[11] 3,727,720
[45] Apr. 17, 1973

[54] MOVABLE APPARATUS FOR USE IN PICKING FRUIT

[76] Inventor: Francois Duc, La Sabatiere, Bergerac, France

[22] Filed: Apr. 12, 1972

[21] Appl. No.: 243,294

[52] U.S. Cl..................................182/38, 182/127
[51] Int. Cl..............................................E06c 5/02
[58] Field of Search.....................182/127, 132, 130, 182/131, 63, 36, 37, 38, 39, 194

[56] References Cited
UNITED STATES PATENTS

| | | | |
|---|---|---|---|
| 835,059 | 11/1906 | Curley | 182/130 |
| 882,161 | 3/1908 | Olive | 182/131 |
| 1,456,813 | 5/1923 | Mitchell | 182/36 |
| 3,340,960 | 9/1967 | Wilson | 182/39 |

*Primary Examiner*—Reinaldo P. Machado
*Attorney*—Joseph F. Brisebois et al.

[57] ABSTRACT

Ladders for use in picking fruit are mounted to slide laterally on a supporting vehicle. The steps of each ladder project laterally beyond one of its uprights.

5 Claims, 6 Drawing Figures

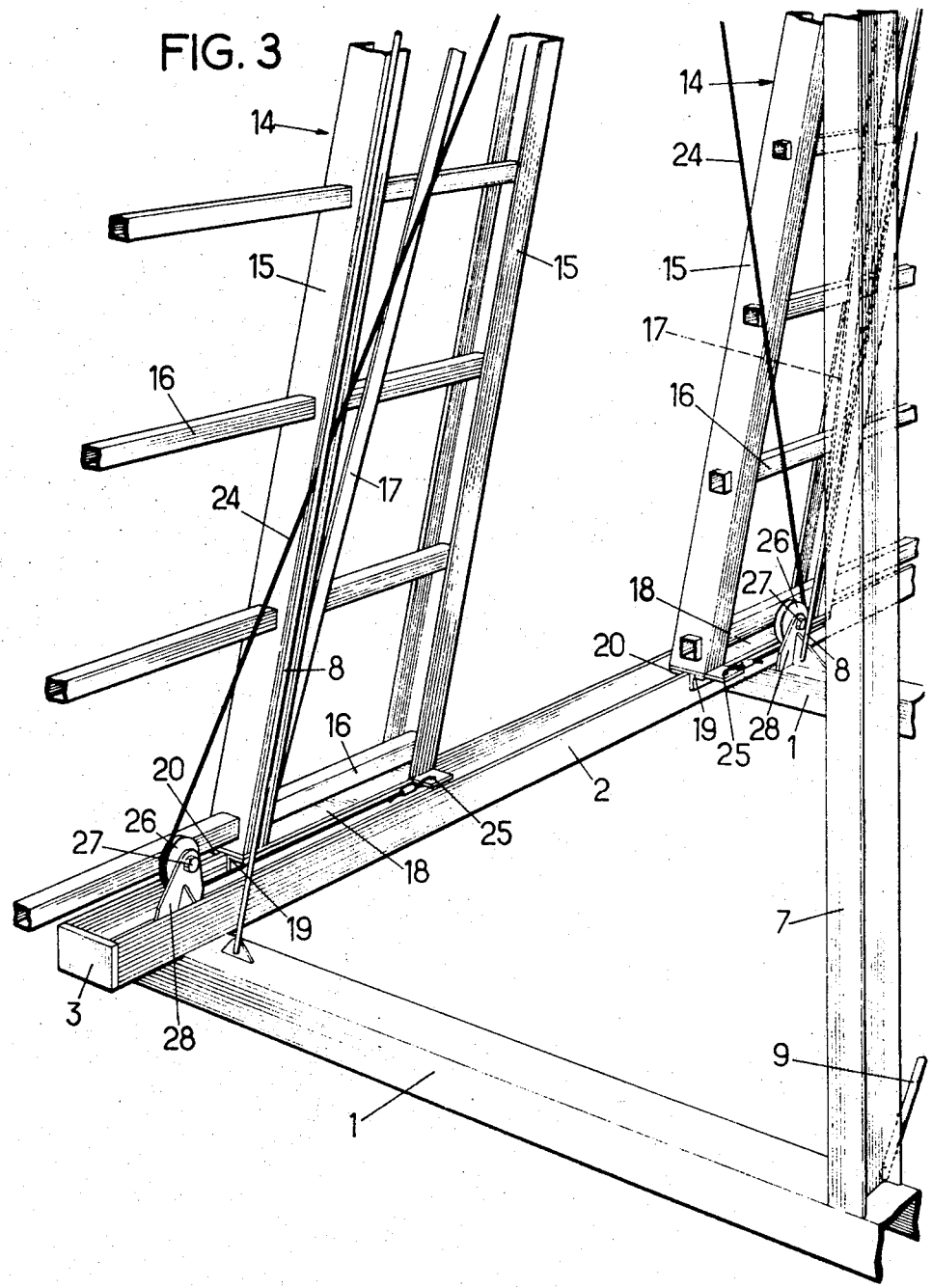

3,727,720

MOVABLE APPARATUS FOR USE IN PICKING FRUIT

SUMMARY OF THE INVENTION

This invention relates to the collection of fruit borne by fruit trees. Conventionally, when collecting fruit from fruit trees by hand, ordinary single or extension ladders are used. The individuals picking the fruit climb these ladders, but they are not adapted to permit the pickers to reach the fruit on all parts of the tree, and in particular near the top of the tree. For this reason many fruit trees are pruned at their tops to reduce this loss of fruit, but this reduces the productivity of the tree.

The object of the invention is to provide a movable device for positioning between fruit trees which permits the pickers to move in three dimensions and thus reach all parts of the trees without being prevented from doing so by the branches.

The invention consists in providing a vehicle which carries a series of ladders, the steps of which are quite long and are supported by the uprights at one end only. These vertical or inclined ladders may be translated in the direction in which the steps extend so that the free ends of the steps may slide between the branches of the trees. The plurality of ladders makes it possible to pick the fruit from half a tree without having to move the vehicle and, under certain circumstances, to pick the fruit from the halves of two trees situated on opposite sides of the vehicle. After retraction of the ladders the assembly may be moved along the path between the trees toward the two next trees.

In order that the invention may be better understood a preferred embodimet thereof will now be described, purely by way of illustration and example, with reference to the accompanying drawings on which:

FIGS. 3 and 4 are partial perspective views on a larger scale, showing the lower part and upper part of the assembly respectively;

Figure 1:
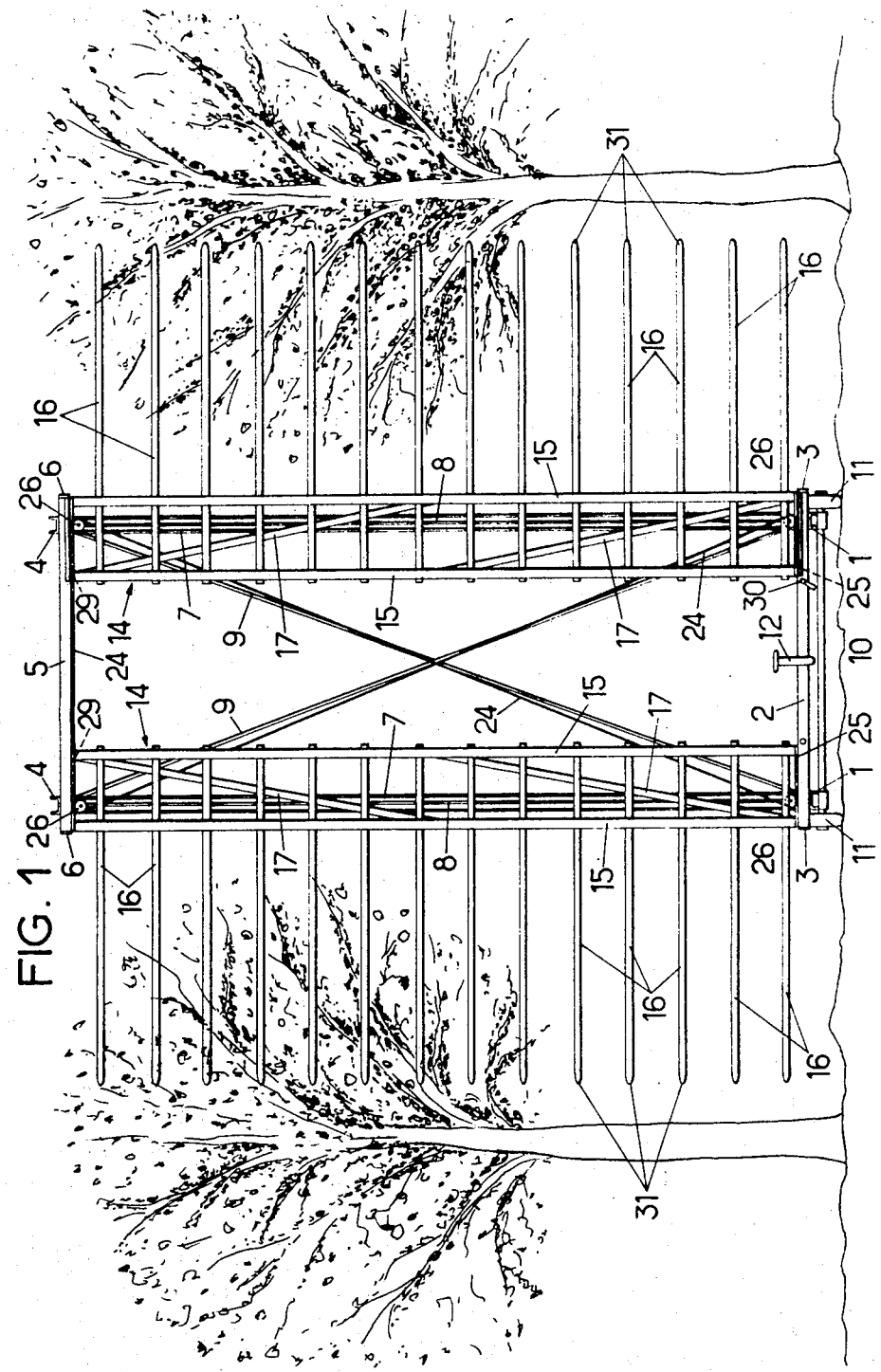
FIG. 1 is a front elevational view of the entire apparatus.
Figure 2:
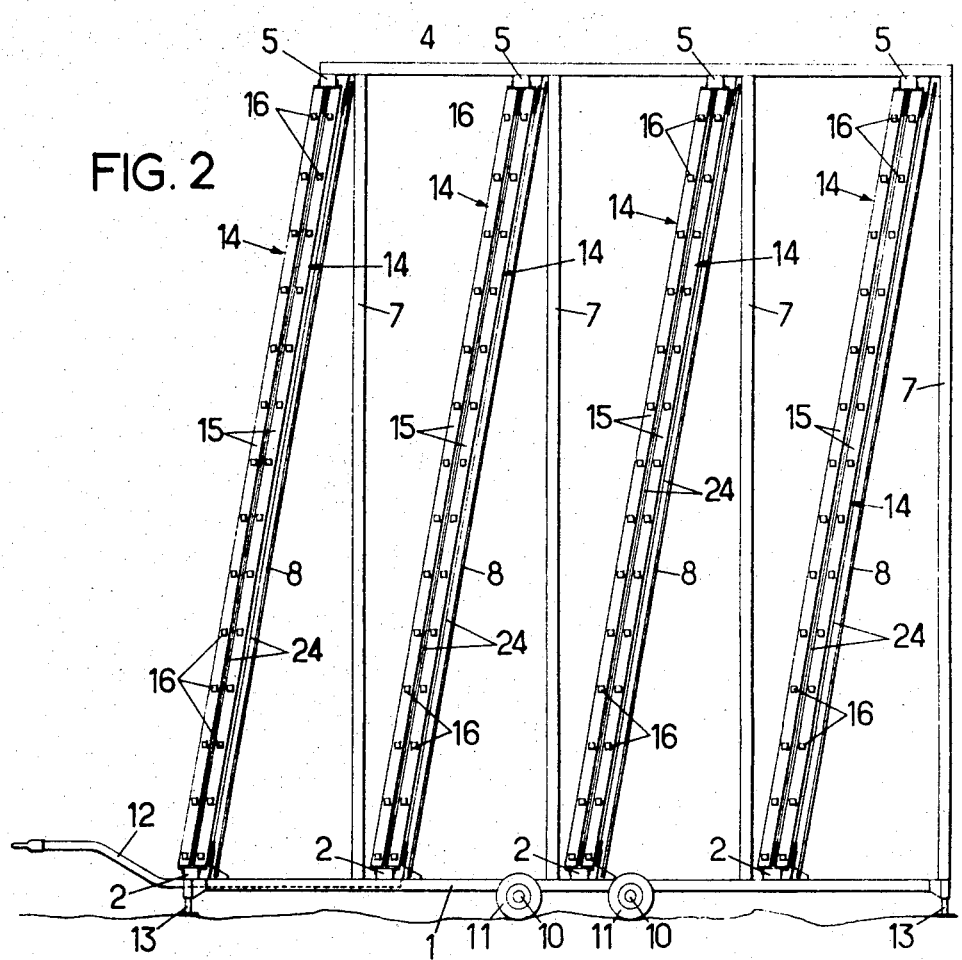
FIG. 2 is a side view of this apparatus.
Figure 5:
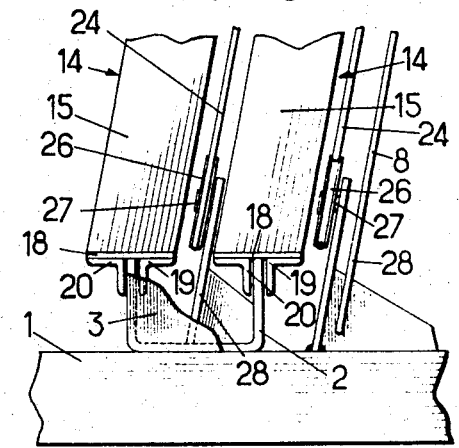
Figure 4:
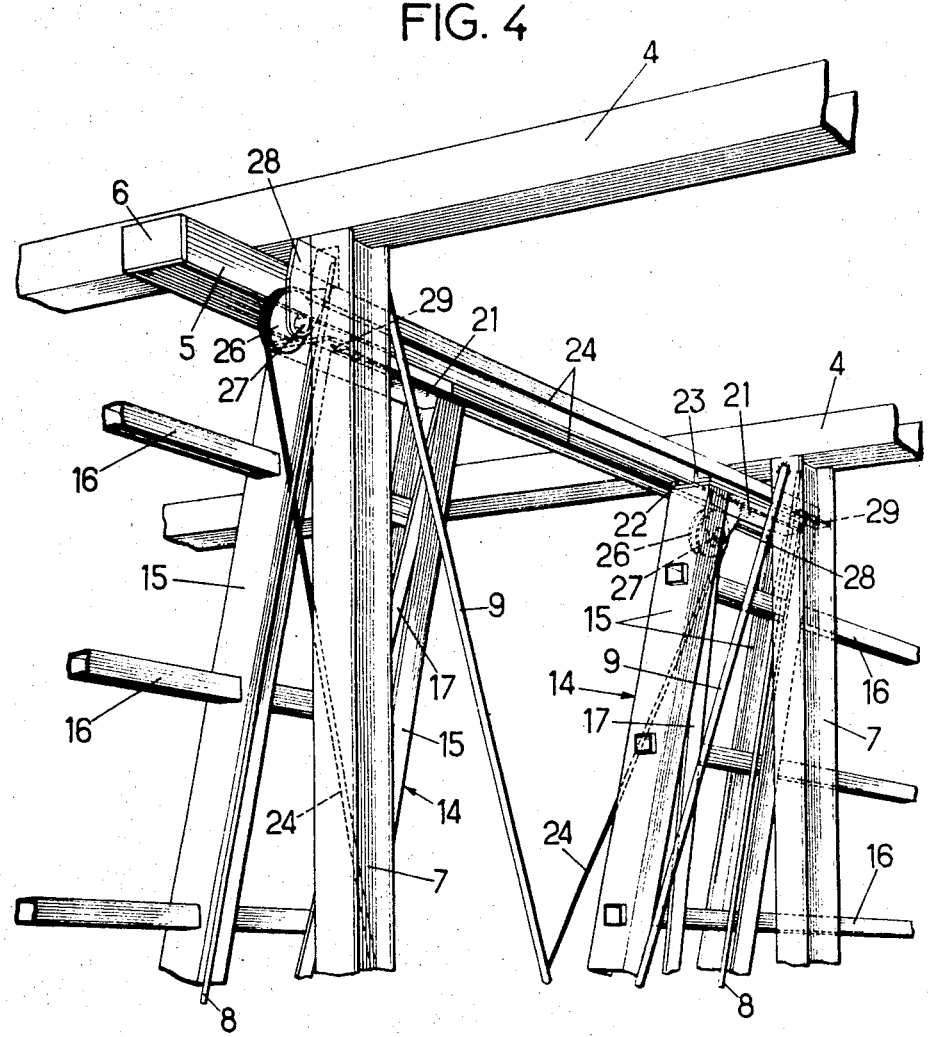

The apparatus comprises a generally vertical framework consisting of two lower longitudinal members 1 having an inverted U section and visible on FIGS. 1, 2, 3 and 5. To these are welded four cross bars 2 which are also U-shaped with the opening of the U upwards. The longitudinal members are closed at their ends by cover members 3 (FIG. 5). At the top of the apparatus are two longitudinal members 4, analogous to the members 1, but opening downwardly. These are connected by four cross bars 5 analogous to the cross bars 2, which also open downwardly and are closed at their ends by plates 6. The apparatus also comprises four vertical uprights 7, having an I or U-shaped section connecting each of the longitudinal members 4 to the longitudinal member 1 therebeneath. This entire welded framework is rigidified by longitudinal braces consisting of diagonal rods 8 as shown in FIG. 2, which are welded to each end of the framework, and by transverse braces formed by two rods 9 which cross each other in each transverse plane comprising two uprights 7 and are welded to the connections between the uprights 7 and the longitudinal members 1 and 4.

This entire framework, thus reinforced, rests on one or two axles 10 provided with wheels 11, so that it may be pulled along by a pole 12 at the front, mounted midway of the two first cross bars 2. Finally, jacks 13 are mounted at the four corners of the apparatus on the longitudinal members 1 so as to space the base of the apparatus from the ground and position it solidly before each use. Eight movable ladders 14 are mounted on this framework and each ladder comprises two uprights 15 which are U-shaped in section and a series of steps 16 made of square tubing, which are characterized by the fact that they extend not only between the two uprights 15, as in the case of an ordinary ladder, but also comprise a part projecting for a substantial distance beyond one of these uprights as shown in FIG. 1. As may be seen on the drawings, the uprights 15 are inclined parallel to the diagonal rods 8. However the steps 16 are positioned and welded to the uprights in such a manner that their upper surface remains horizontal. In order to prevent deformation of the ladder under the weight carried by these projecting steps, each ladder is provided with a diagonal brace 17 consisting of a steel strip welded to the rear flanges of the uprights 15.

As seen in greater detail on FIG. 5, the lower ends of the two uprights 15 of each ladder are welded to a strong plate 18 beneath which two angle irons 19 and 20 are attached so as to leave therebetween a small space just sufficient to permit the assembly to be seated on the upper edge of one of the vertical sides of a cross bar 2. The angle iron 19 is, for example, welded to the plate 18, while the angle iron 20 is adjustably mounted to permit adjustment of the tolerance required to permit sliding of the ladder on the cross bar.

Figure 6:
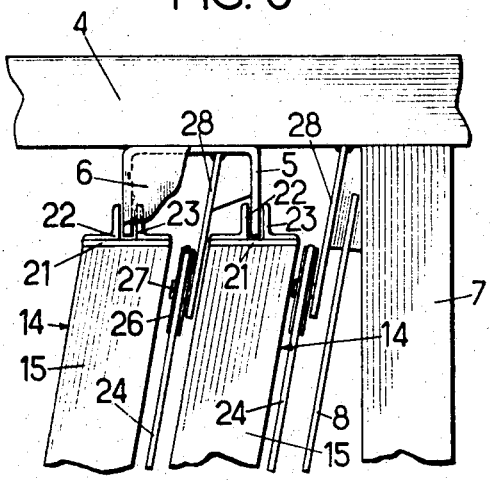
FIGS. 5 and 6 are elevational views on a larger scale showing structural details of the slidable parts.

At the upper end of each ladder, as shown in FIG. 6, there is a similar but inverted arrangement including a plate 21 attached to the upper ends of the uprights of the ladder and carrying an angle iron 22 welded thereto and an angle member 23 which is adjustable to permit the reception of and sliding movement along one of the vertical sides of the upper cross bars. This angle iron, which is removable, also make it possible to mount the ladder during assembly of the apparatus.

As a consequence of the spacing of the two ladders of each pair mounted on the two sides of each of the channel members 2 and 5 it will be appreciated that each ladder may slide from the entirely projected position illustrated on FIG. 1 to an entirely retracted position in which none of the steps extend beyond the framework of the vehicle.

However, because of the substantial distance between the transverse members 2 and 5 due to the great height of the ladders, and, on the other hand, because of the short guide means provided by the plates 18 and 21 and the angle irons 19, 20, 22 and 23 it is easy to understand that each of the ladders, the center of gravity of which is not directly above its supporting base, tends to become locked in its transverse quides and does not remain parallel thereto.

To nevertheless ensure parallel guiding of each ladder and permit it to slide easily between its retracted and extended positions, a simple cable device may be used which comprises a steel cable 24 the lower end of which is attached to an extension 25 of the base plate 18 of one ladder, as best seen in FIG. 3. This cable then passes over a pulley 26 turning about a shaft 27 carried by a plate 28 mounted on the cross bar 2 or the longitudinal member 1. The cable 24 then travels diagonally to pass over another pulley 26 at the top of the ladder, analogous to the preceding one, and attached in the same way. After passing over this upper pulley the cable again becomes horizontal and is attached to a projection 29 from the upper plate 21 of the same ladder. In this manner the angular torque due to the position of the center of gravity of the ladder only tensions the cable, which resists swinging by the ladder, while permitting it to slide. In effect, each time that an end of the ladder is moved along a cross bar 2 by a certain distance, the other end of the ladder is moved by the cable for the same distance.

Of course, when a ladder arrives in position to be used, as shown in FIG. 1, the ends of the angle irons 22 and 23 at the top abut the end plates 6 of the cross bar 5 at the same time that the angle irons 19 and 20 at the bottom abut the end plate 3 of the cross bar 2. In order to immobilize this ladder and to relieve the corresponding cable and prevent it from stretching, a key consisting of a simple spike passing through one side of the cross bar 2 is positioned, as indicated at 30 on FIG. 1, in an appropriate orifice and latches the base of the ladder in place. After having thus immobilized the ladder, the persons who are to pick the fruit may then climb on the steps without stretching the cable. Conversely, when the ladder is completely retracted and its angle irons abut the other end plates 6 and 3 of the cross bars 5 and 2, a key of the same type may be provided to ensure that the ladder does not shift while the apparatus is travelling. In effect, in this position, the cable 24 immobilizes the upper part of the ladder so that it is not necessary to provide a key in the upper cross bar 5.

In order to use the apparatus with all the ladders in retracted position, the vehicle is first pulled by a tractor into the space between two trees as shown in FIG. 1. After having immobilized the vehicle and spaced it from the ground with the jacks 13, the ladders are extended outwardly either by hand or by suitable mechanical means. During this extension the free ends of the steps 16 which project into the zone occupied by the branches of the tree penetrate easily between the branches due to the thin ends 31 with which they are provided. After the keys 30 have been put in place, the pickers climb the steps 16 to the desired height and may move horizontally along these steps to reach all parts of the tree.

In view of the fact that each picker may reach all the fruit located a certain distance in front and a certain smaller distance in back of the plane of the ladders it suffices for the space between two successive ladders on one side of the vehicle to be equal to or smaller than the sum of these distances in order to permit pickers to reach the entire space within the limits of the apparatus, or more exactly, the entire space accessible from the vertical plane containing all the points 31 on one side of the vehicle. The apparatus is so arranged that this space encompasses the halves of two trees on opposite sides of a path, which are thus directly accessible without moving the apparatus. By a series of successive movements of the apparatus along a path and then along an adjacent path it is thus possible to pick all the fruit of all the trees at the rate of two half trees (that is to say one complete tree) per change in position of the apparatus. Of course, for each change in position all the ladders are retracted to avoid striking the branches and the fruit. The apparatus is thus very practical and extremely reliable, and makes it possible to pick all the fruit regardless of the shape and size of the trees, provided that the height of the apparatus is sufficient.

It will of course be appreciated that this embodiment has been described purely by way of illustration and example and may be modified as to detail without thereby departing from the basic principles of the invention.

What is claimed is:

1. Movable apparatus for use in picking fruit comprising a framework, means for moving said framework, and a plurality of ladders carried by said framework, each ladder comprising two uprights connected by a series of steps with each step projecting from one of said uprights in a direction away from the other upright for the greater portion of the length of the step, and means mounting each of said ladders on said framework for translational movement longitudinally of said steps between a retracted position in which said steps are within said framework and an extended position in which they project therefrom.

2. Apparatus as claimed in claim 1 in which the framework is elongated with half the ladders slidable toward one side of the framework and half slidable toward the other.

3. Apparatus as claimed in claim 1 in which those ladders on one side of the framework are positioned in parallel equidistant planes, with the distance therebetween corresponding to the zone accessible from the adjacent sides of two adjacent ladders.

4. Apparatus as claimed in claim 1 in which the upper and lower ends of the ladders are slidable in transverse upper and lower cross members carried by said framework, and each ladder is prevented from swaying as it slides by a cable having its ends attached to the two ends of that ladder and running over pulley means at each end of that ladder.

5. Apparatus as claimed in claim 4 which comprises a key for latching the lower part of each of the ladders to a cross member in its extended and retracted positions.

* * * * *